(12) United States Patent
Sato

(10) Patent No.: US 7,980,075 B2
(45) Date of Patent: Jul. 19, 2011

(54) RESERVOIR AND MASTER CYLINDER

(75) Inventor: Shoichi Sato, Minami-Alps (JP)

(73) Assignee: Hitachi, Ltd., Tokyo (JP)

( * ) Notice: Subject to any disclaimer, the term of this patent is extended or adjusted under 35 U.S.C. 154(b) by 563 days.

(21) Appl. No.: 12/078,159

(22) Filed: Mar. 27, 2008

(65) Prior Publication Data

US 2008/0256948 A1 Oct. 23, 2008

(30) Foreign Application Priority Data

Apr. 20, 2007 (JP) ................................ 2007-112012

(51) Int. Cl.
*B60T 11/26* (2006.01)
*F15B 7/00* (2006.01)
(52) U.S. Cl. .......................................... 60/592; 60/585
(58) Field of Classification Search ................. 60/585, 60/592
See application file for complete search history.

(56) References Cited

U.S. PATENT DOCUMENTS

| 4,414,810 A | * | 11/1983 | Reinartz et al. | ................. | 60/535 |
| 4,488,404 A | * | 12/1984 | Arakawa et al. | ................. | 60/535 |
| 4,502,281 A | * | 3/1985 | Arakawa | ......................... | 60/585 |
| 4,505,113 A | * | 3/1985 | Reinartz et al. | ................. | 60/535 |

FOREIGN PATENT DOCUMENTS

| GB | 2248094 A | * | 3/1992 |
| JP | 11-208447 | | 8/1999 |
| JP | 11-222118 | | 8/1999 |
| JP | 11-301452 | | 11/1999 |

OTHER PUBLICATIONS

Japanese Office Action (in English language) issued Jul. 13, 2010 in corresponding to Japanese Patent Application No. 2007-112012.
Japanese Office Action (with English translation) issued Mar. 15, 2011 in corresponding Japanese Patent Application No. 2007-112012.

* cited by examiner

*Primary Examiner* — Thomas E Lazo
(74) *Attorney, Agent, or Firm* — Wenderoth, Lind & Ponack, L.L.P.

(57) ABSTRACT

A reservoir capable of shortening a time period required to fill a brake system and a clutch system with a fluid with vacuuming in a case where the reservoir has a brake reservoir chamber to be connected to a brake master cylinder of the brake system and a clutch reservoir chamber to be connected to a clutch master cylinder of the clutch system. The reservoir (12) includes a brake reservoir chamber (28) and an inlet port for injecting the brake reservoir chamber (28) with a fluid from outside. The reservoir further includes a clutch reservoir chamber (29) separated from the brake reservoir chamber (28), and a communication passage (37) providing communication between the inlet port and the brake reservoir chamber (28). The communication passage is branched so as to communicate with the clutch reservoir chamber (29).

21 Claims, 11 Drawing Sheets

RESERVOIR AND MASTER CYLINDER

BACKGROUND OF THE INVENTION

The present invention relates to a reservoir having a brake reservoir chamber connected to a brake master cylinder and a clutch reservoir chamber connected to a clutch master cylinder, and a master cylinder.

Some vehicles equipped with a hydraulic brake system and a hydraulic clutch system may employ such a configuration in which a reservoir for supplying a fluid to a brake system and a reservoir for supplying a fluid to a clutch system are integrally formed by a single reservoir (for example, see Japanese Patent Publication No. Hei 11-222118). This type of reservoir has an inlet port 101 for supplying a fluid from outside, a brake reservoir chamber 102 connected to a brake master cylinder of a brake system, and a clutch reservoir chamber 103 connected to a clutch master cylinder of a clutch system, and is configured such that the inlet port 101 communicates with the brake reservoir chamber 102 via a communication passage through a communication port 105, and further communicates with the clutch reservoir chamber 103 from the brake reservoir chamber 102 via a communication port 106, as shown in FIG. 11. Further, the communication ports 105, 106 are designed to open at a predetermined height from a bottom portion of the brake reservoir chamber 102.

SUMMARY OF THE INVENTION

In most case, the brake system and the clutch system are filled with a fluid with vacuuming and, if such a configuration is employed in which the inlet port of the reservoir is in communication with the clutch reservoir chamber via the brake reservoir chamber, as mentioned above, the brake fluid supplied from the inlet port is used during the vacuuming process firstly to fill the brake system through the brake reservoir chamber, then to fill up the brake reservoir chamber having relatively a large capacity, and finally is introduced into the clutch reservoir chamber so as to fill the clutch system. Consequently, there has been a problem that a long period of time is required for filling up with the brake fluid.

Therefore, an object of the present invention is to provide a reservoir and a master cylinder capable of shortening a period of time required to fill a brake system and a clutch system with a brake fluid with vacuuming in a configuration having a brake reservoir chamber connected to a brake master cylinder of a brake system and a clutch reservoir chamber connected to a clutch master cylinder of a clutch system.

In order to achieve the above-described objects, the present invention provides a reservoir comprising a brake reservoir chamber adapted to reserve a fluid therein and connected to a brake master cylinder, and an inlet port for supplying the fluid to the brake reservoir chamber from outside, said reservoir further comprising a clutch reservoir chamber separated from the brake reservoir chamber and connected to a clutch master cylinder, wherein a communication passage providing communication between the inlet port and the brake reservoir chamber is branched so as to communicate with the clutch reservoir chamber.

Further, the present invention provides a reservoir comprising a brake reservoir chamber adapted to reserve a fluid therein and connected to a brake master cylinder, and an inlet port for supplying the fluid to the brake reservoir chamber from outside, said reservoir further comprising a communication port opening at one side of the brake reservoir chamber, and a corridor extending from said communication port and turning to an opposite side of the reservoir from said one side and being provided with said inlet port in an upper area of said corridor, wherein said corridor is arranged such that an inlet port side of said corridor is disposed on a front side in a vehicle longitudinal direction and a communication port side of said corridor is disposed on a rear side in the vehicle longitudinal direction, and is branched such that one of the branched communication passage is in communication with said communication port, and the other of the branched communication passage is in communication with a clutch reservoir chamber, which is separated from the brake reservoir chamber and connected to a clutch master cylinder.

Further, the present invention provides a master cylinder having a reservoir comprising a brake reservoir chamber adapted to reserve a fluid therein and connected to a cylinder body, and an inlet port for supplying the fluid to the brake reservoir chamber from outside, wherein said reservoir has a clutch reservoir chamber separated from the brake reservoir chamber and connected to a clutch master cylinder, and wherein a communication passage providing communication between said inlet port and said brake reservoir chamber is branched so as to communicate with the clutch reservoir chamber.

DETAILED DESCRIPTION OF THE PREFERRED EMBODIMENT

An explanation will be given of a reservoir according to a first embodiment of the present invention in reference to FIG. 1 through FIG. 6.

Figure 1:
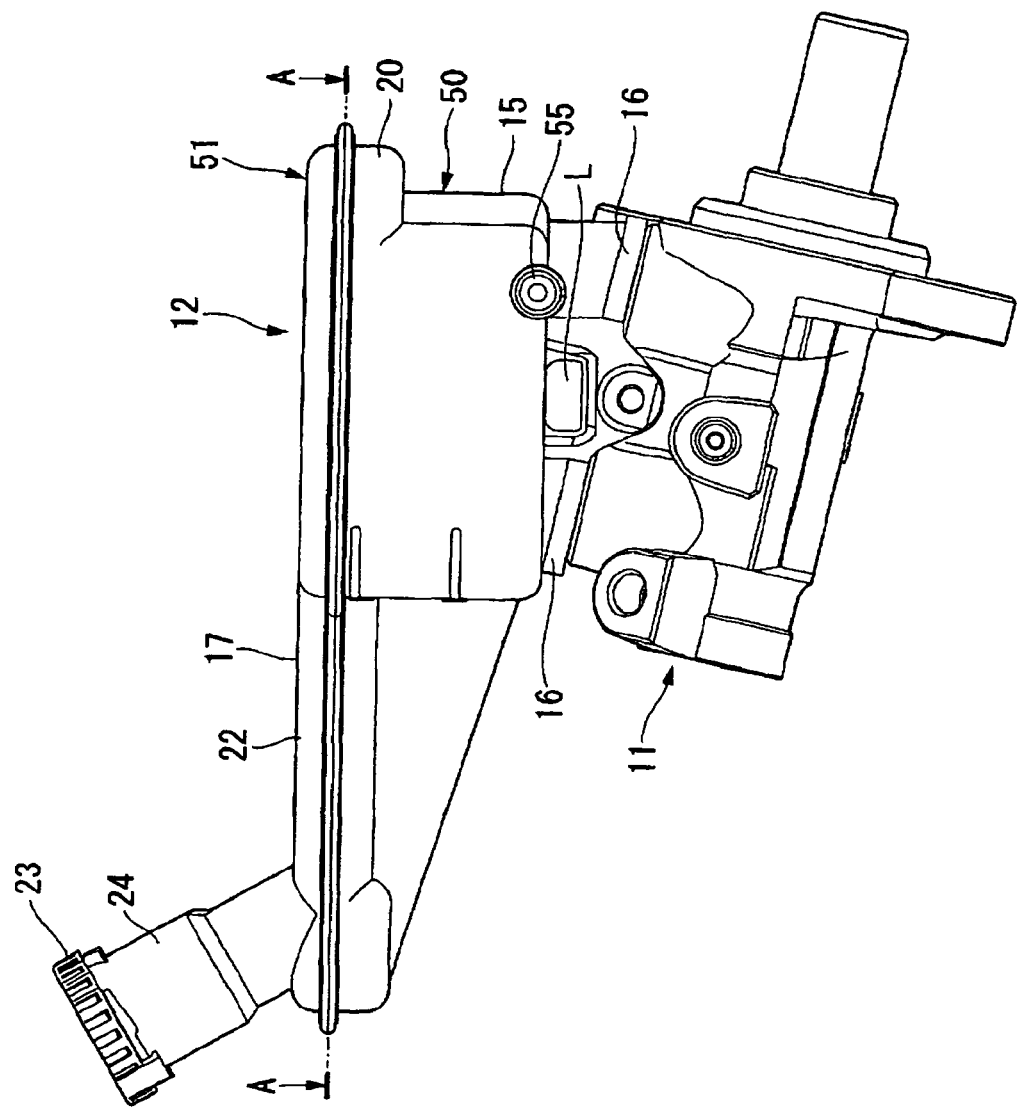
FIG. 1 is a side elevational view showing a reservoir and a brake master cylinder according to a first embodiment of the present invention.
Figure 2:
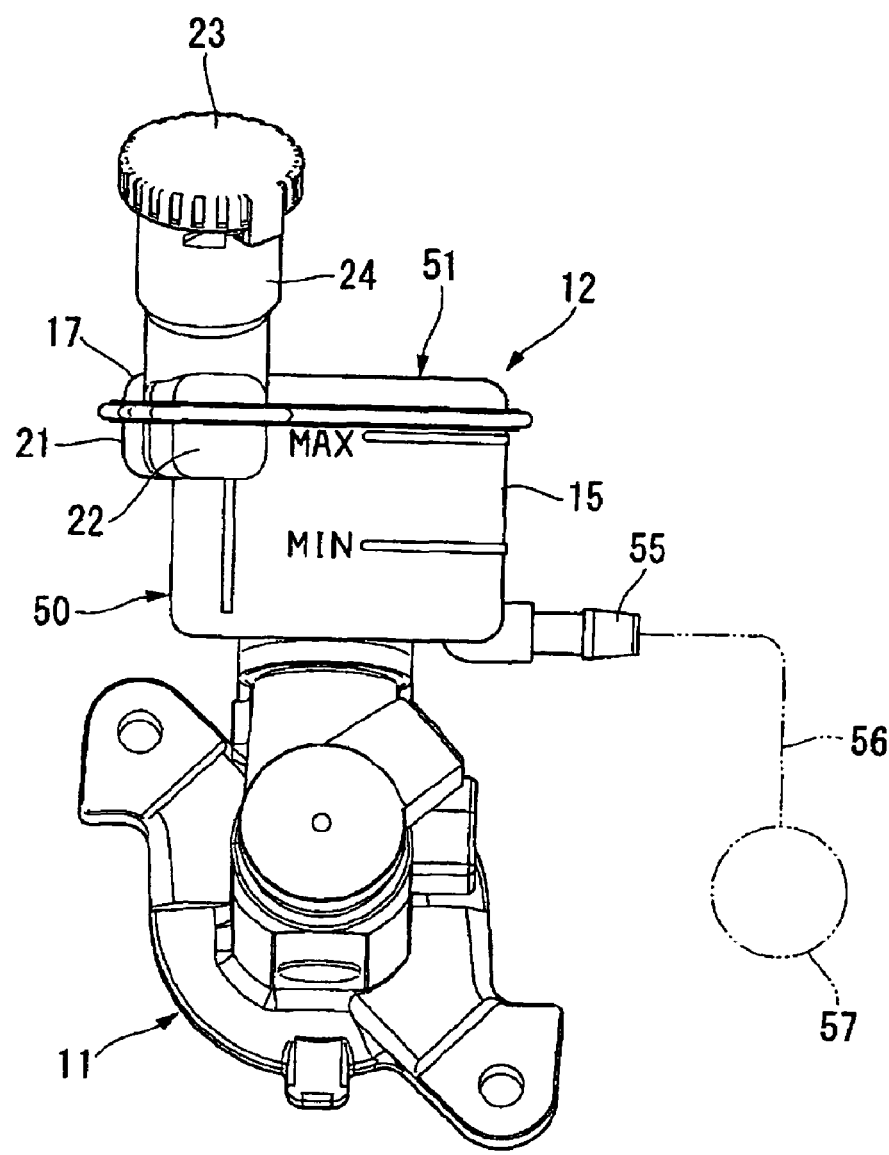
FIG. 2 is a front elevational view showing the reservoir and the brake master cylinder according to the first embodiment of the present invention.

In FIG. 1 and FIG. 2, reference numeral 11 designates a brake master cylinder 11 of a brake system for a vehicle, and reference numeral 12 designates a reservoir 12 mounted on an upper area of the brake master cylinder 11 for reserving a fluid according to a first embodiment, respectively. It is to be noted that the brake master cylinder 11 and the reservoir 12 are mounted to a vehicle body with an input side of the brake master cylinder 11 (right side in FIG. 1) arranged on a rear side in a longitudinal direction of the vehicle. The explanation hereinafter is made for a condition of the master cylinder mounted on a vehicle, and a description of "longitudinal" and "lateral" designates those of a vehicle.

The reservoir 12 comprises a reservoir body portion 15 having a shape of substantially rectangular parallelopiped container, boss portions 16 provided in a lower area of the reservoir body portion 15 at two places along a longitudinal direction for mounting the reservoir to the brake master cylinder 11, and a hollow corridor forming portion 17 provided in an upper area of the reservoir body portion 15.

The corridor forming portion 17 comprises a rear forming portion 20 slightly protruding backward from an upper area of a back face of the reservoir body portion 15, a side forming portion 21 protruding sideward from an upper portion of a side face on one side (right side) in a lateral direction of the reservoir body portion 15, and a frontward extending portion 22 extending horizontally frontward from a front end portion of the side forming portion 21. An upper portion on a front end side of the frontward extending portion 22 is provided with an inlet port 24 having a stepped cylinder shape to be closed by a separate cap body 23 and inclining forward upwardly.

Figure 3:
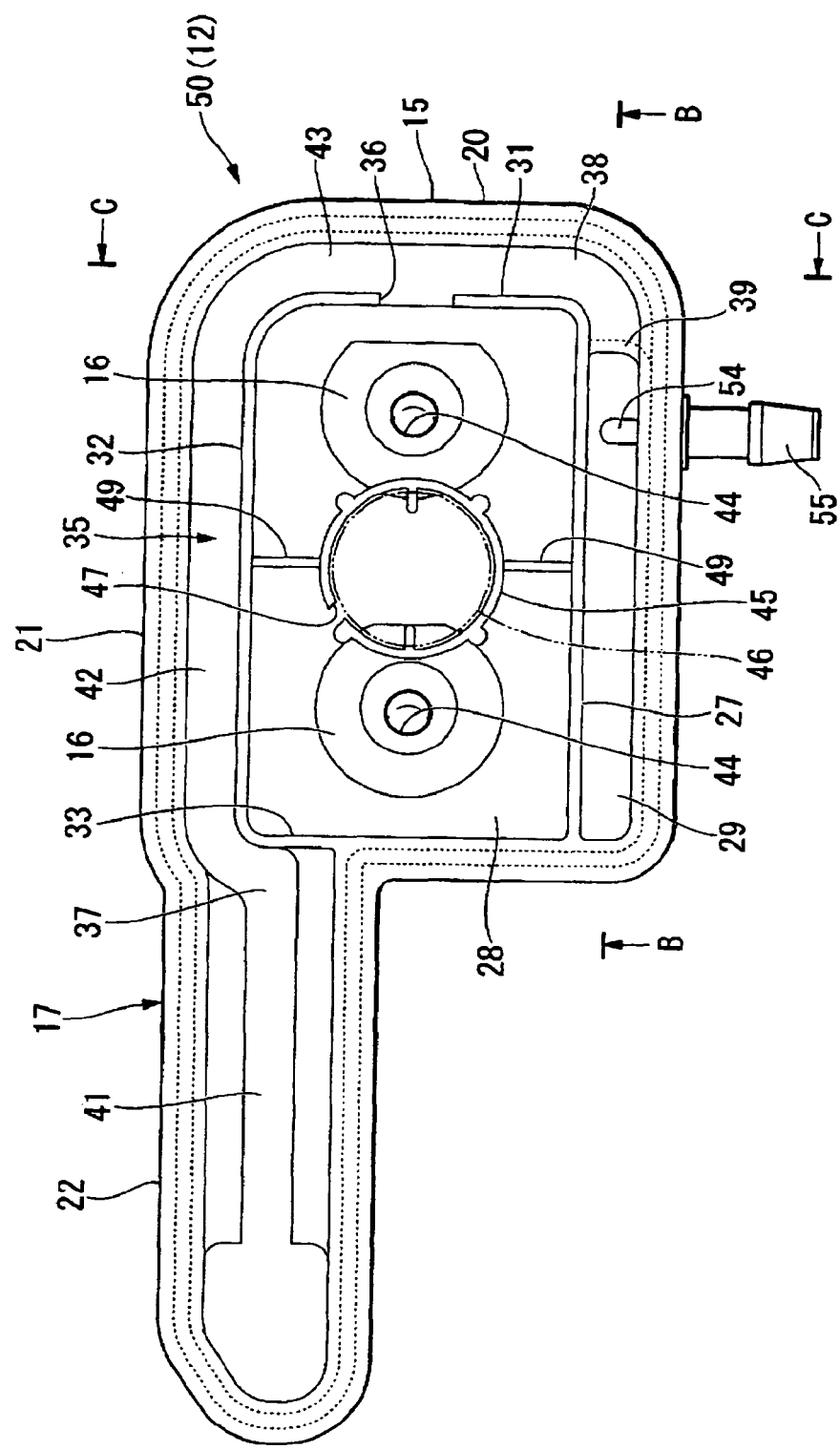
FIG. 3 is a plan view illustrating main components of the reservoir according to the first embodiment of the present invention.
Figure 4:
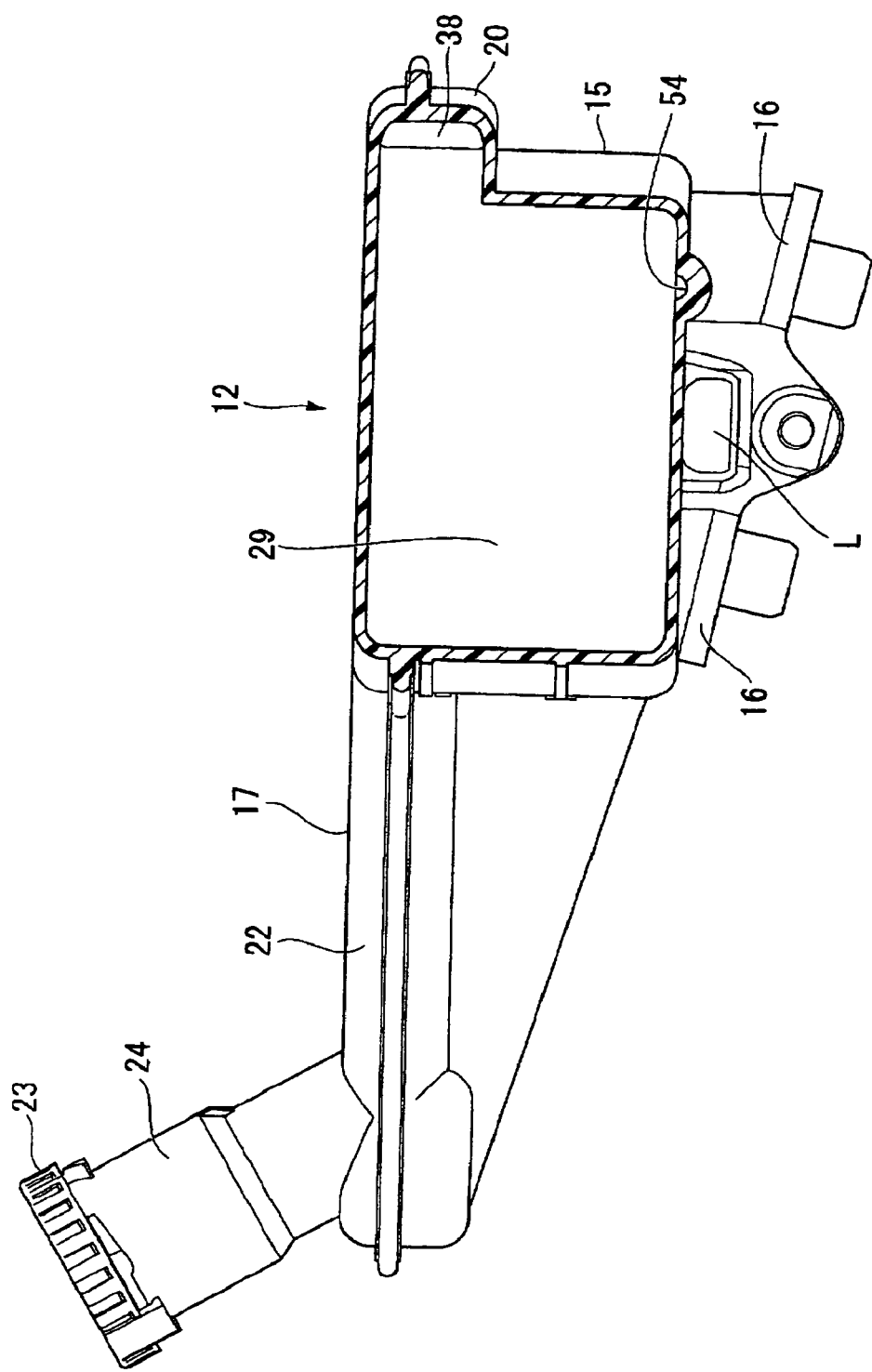
FIG. 4 is a sectional view of the reservoir according to the first embodiment of the present invention taken along a line B-B of FIG. 3.

An inside of the reservoir body portion 15 is partitioned by a partitioning wall portion 27 disposed in an opposite side (left side) from the one side in the lateral direction and extending perpendicular to the lateral direction, as shown in FIG. 3, into a brake reservoir chamber 28 on the one side (right side) in the lateral direction having a large capacity for reserving a fluid, and a clutch reservoir chamber 29 on the opposite side in the lateral direction having a relatively small capacity for reserving a fluid, also as shown in FIG. 4. In this arrangement, the brake reservoir chamber 28 and the clutch reservoir chamber 29 are located alongside in a lateral direction, in other words, the clutch reservoir chamber 29 is located on a lateral side in a vehicle with respect to the brake reservoir chamber 28.

Further, a partitioning wall portion 31 is formed uprightly in succession to the partitioning wall portion 27 described above at a boundary location between the brake reservoir chamber 28 and the rear forming portion 20 of the corridor forming portion 17 so as to extend perpendicular to the longitudinal direction. A partitioning wall portion 32 is formed uprightly in succession to the partitioning wall portion 31 at a boundary location between the brake reservoir chamber 28 and the side forming portion 21 of the corridor forming portion 17 so as to extend perpendicular to the lateral direction. A partitioning wall portion 33 is formed uprightly in succession to the partitioning wall portion 32 at a boundary location between the brake reservoir chamber 28 and the frontward extending portion 22 of the corridor forming portion 17 so as to extend perpendicular to the longitudinal direction.

Figure 5:
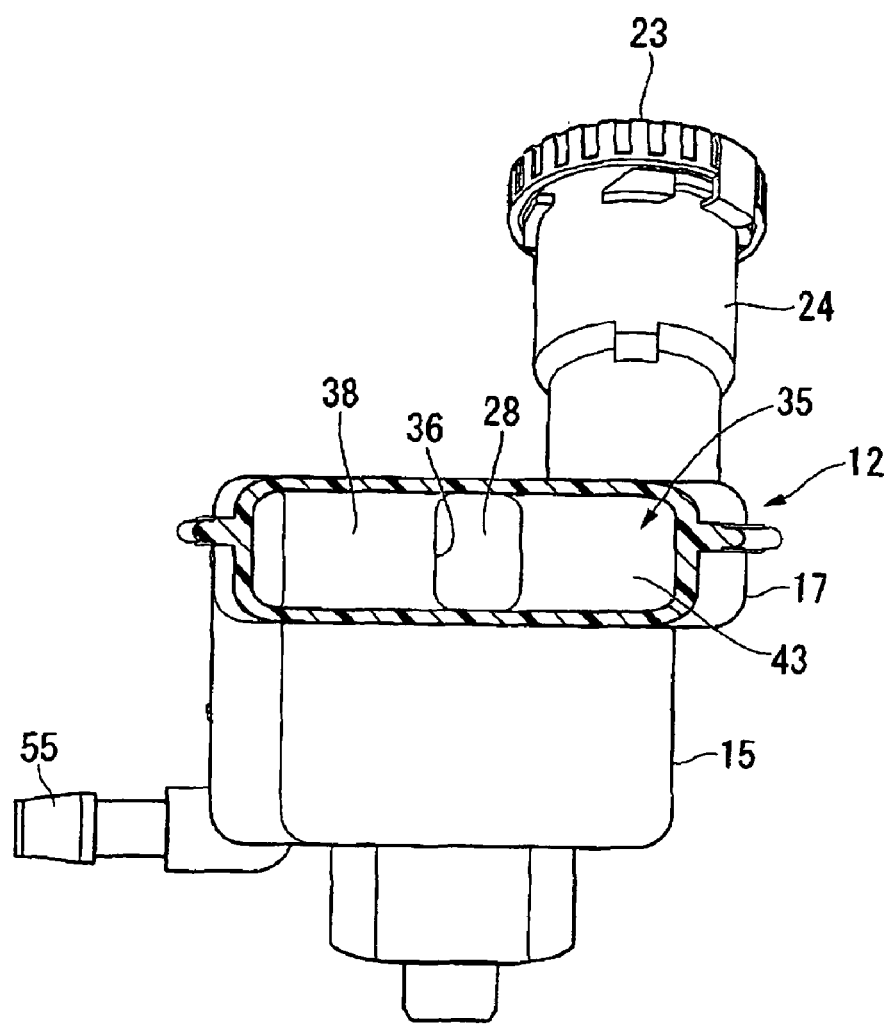
FIG. 5 is a sectional view of the reservoir according to the first embodiment of the present invention taken along a line C-C of FIG. 3.

With an arrangement of these partitioning wall portions 27, 31, 32, and 33, a substantially L-shaped corridor 35 is formed in the corridor forming portion 17, which is separated from the brake reservoir chamber 28 and adapted to communicate with the inlet port 24 (see FIG. 1) at one end and with the clutch reservoir chamber 29 at the other end. The rear partitioning wall portion 31 is provided with a communication port 36 at a mid portion in the lateral direction so as to provide a communication between the corridor 35 and the brake reservoir chamber 28, as shown in FIG. 3 and FIG. 5, and thus the corridor 35 is separated into a communication passage 37 providing communication between inlet port 24 located on the front side and the brake reservoir chamber 28 via a communication port 36 located on the rear side and opening rearward, and a branch passage 38 branching from the communication passage 37 and communicating with the clutch reservoir chamber 29, as shown in FIG. 3. In other words, the corridor 35 extends from the communication port 36 opening rearward and turns forward toward an opposite side from the communication port 36, where the inlet port 24 is provided in an upper area of a front portion of the corridor 35, and the corridor 35 is branched such that one branch or the communication passage 37 communicates with the communication port 36, and the other branch or the branch passage 38 communicates with the clutch reservoir chamber 29 separated from the brake reservoir chamber 28 in a rear area of the reservoir 12. That is to say, a communication port 39 between the branch passage 38 and the clutch reservoir chamber 29 is located on the rear side in the reservoir 12. The communication passage 37 is separated into a first path portion 41 in the frontward extending portion 22, a second path portion 42 in the side forming portion 21, and a third path portion 43 in the rear forming portion 20.

Figure 6:
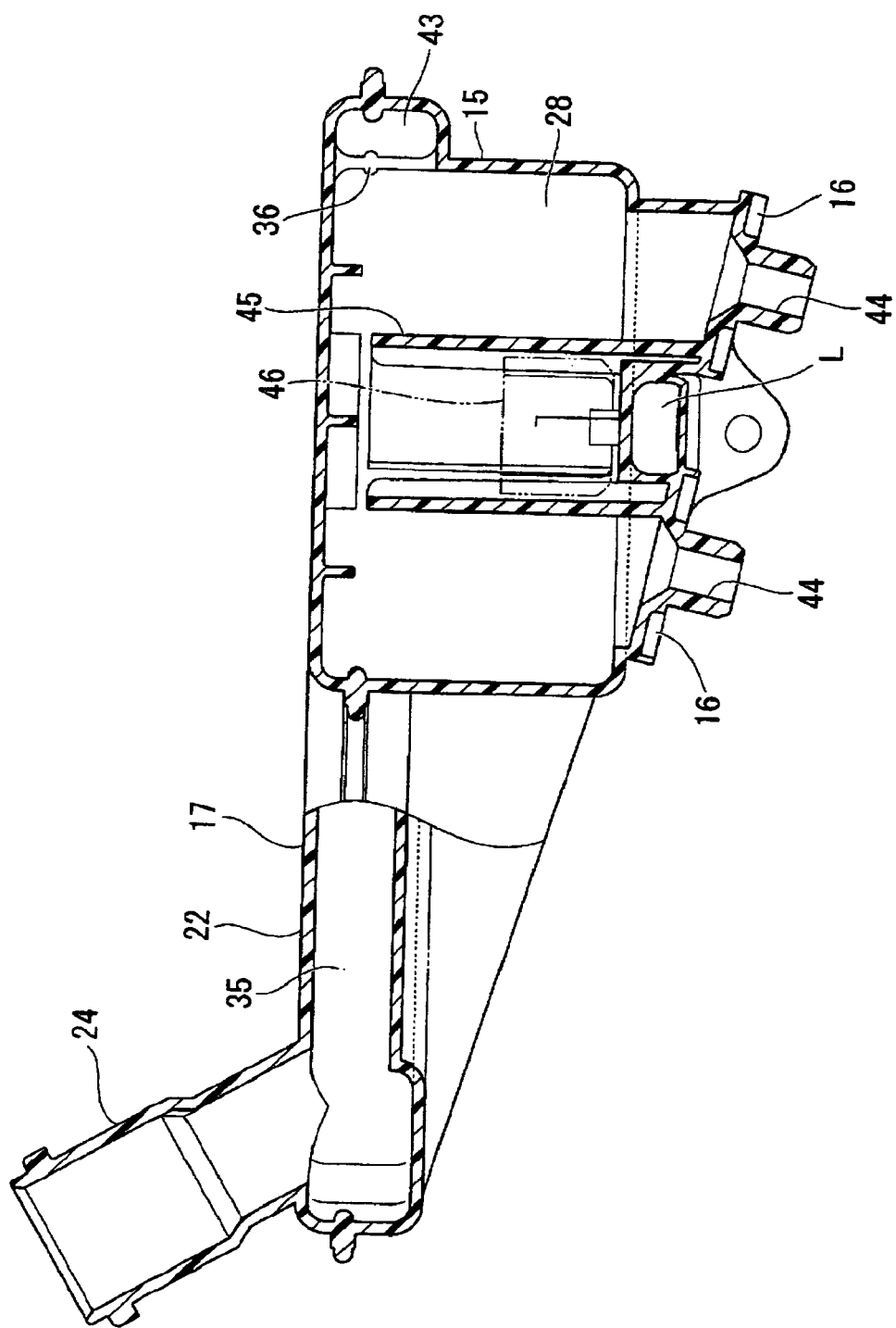
FIG. 6 is a main sectional view illustrating the reservoir according to the first embodiment of the present invention.

A bottom portion forming the brake reservoir chamber 28 of the reservoir body portion 15 is provided with, at two places, front and rear connection holes 44 along a longitudinal direction, each extending through a boss portion 16 for mounting the reservoir to the brake master cylinder 11, as also shown in FIG. 6, and with this arrangement, the brake reservoir chamber 28 is connected to the brake master cylinder 11. In addition, the bottom portion of the brake reservoir chamber 28 of the reservoir body portion 15 is further provided with a guide 45 having a substantially cylindrical shape and extending in a vertical direction at a location between the front and rear connection holes 44. In the guide 45, a float 46 having a magnet for detecting a lowering of a fluid level in the brake reservoir chamber 28 with a limit switch L (FIG. 1 and FIG. 6) is operatively held so as to be movable in an up and down direction. The guide 45 is provided with an opening portion 47 on a diagonally front side for introducing the fluid into the guide 45. Further, right and left sides in a lower portion of the guide 45 is connected to and reinforced by an inner wall of the reservoir body portion 15 with a reinforcing panel portion 49 extending perpendicular to the longitudinal direction. It is to be noted that the inside of the brake reservoir chamber 28 is substantially symmetrical in the lateral direction. It is also to be noted that the reservoir 12 is formed by welding a main component 50 of integrally molded resin product to an upper component 51 of integrally molded resin product, these components being separated from each other by a line A-A shown in FIG. 1.

As shown in FIG. 3 and FIG. 4, a bottom portion of the clutch reservoir chamber 29 of the reservoir body portion 15 is provided in a rear area thereof with a downwardly recessed flow path concave portion 54, and, as shown in FIG. 3, an external connecting pipe portion 55 is provided protruding laterally so as to communicate with the flow path concave portion 54. The external connecting pipe portion 55 is connected to a hose 56, as schematically shown in FIG. 2, which is in turn connected to a clutch master cylinder 57 of the clutch system. Thus, the clutch reservoir chamber 29 shown in FIG. 3 is connected to the clutch master cylinder 57.

A fluid supplied through the inlet port 24 from outside is introduced into the brake reservoir chamber 28 via the communication passage 37 and communication port 36 to be reserved therein, and into the clutch reservoir chamber 29 via the branch passage 38 branched from the communication passage 37 to be reserved therein.

When supplying a fluid to a brake system and a clutch system in workshop and so on, a fluid is supplied into the reservoir 12 via the inlet port 24 while applying a vacuuming to a terminal side of the brake system and the clutch system so that the brake system including the brake master cylinder 11 and the clutch system including the clutch master cylinder 57 may be filled with the fluid through the reservoir 12.

According to the reservoir 12 of the first embodiment described above, since the communication passage 37 providing communication between the inlet port 24 and the brake reservoir chamber 28 is branched into the branch passage 38 which communicates with the clutch reservoir chamber 29. In other words, the corridor 35 extending from the communication port 36 opening on one side of the brake reservoir chamber 28 and turning to the opposite side from the one side is branched into the branch passage 38 which communicates with the clutch reservoir chamber 29. Therefore when supplying a fluid with vacuuming, it is possible to fill the clutch system including the clutch master cylinder 57 via the clutch reservoir chamber 29 with the fluid in parallel with filling the brake system including the brake master cylinder 11 with the fluid from the inlet port 24 via the brake reservoir chamber 28. Accordingly, the time period required to fill the brake system and the clutch system with the fluid with vacuuming can be shortened. Further, a refilling property for the brake fluid can be improved.

Further, since the brake reservoir chamber 28 and the clutch reservoir chamber 29 can be arranged separately, the interior of the brake reservoir chamber 28 can be formed to be substantially symmetrical in the lateral direction. Therefore, even if a lateral acceleration is applied to the fluid during vehicle turning driving, positional difference of the fluid level in the clutch reservoir chamber 29 can be restrained, so that it can be prevented to erroneously detect an insufficient volume of the fluid by the float 46 in the brake reservoir chamber 28 coming close to the limit switch L. In addition, an increase in the capacity of the brake reservoir chamber is not necessary otherwise required to accommodate an increase in a fluid volume in order to compensate for the fluid level change possibly in the brake reservoir chamber caused by a fluid movement from the brake reservoir chamber to the clutch reservoir chamber described above, consequently, leading to a downsizing of the reservoir.

Further, the inlet port 24 is located on the front side in the longitudinal direction of the vehicle and the communication port 36 between the communication passage 37 and the brake reservoir chamber 28 is located on the rear side in the longitudinal direction of the vehicle, so that even in a case an acceleration is applied to the fluid, for example during vehicle accelerating driving, the quantity of fluid flowing out of the brake reservoir chamber 28 may be limited to a small volume. Therefore, a change in the fluid level in the brake reservoir chamber 28 can be controlled during vehicle driving, and this also contributes in preventing an erroneous detection of an insufficient volume of the fluid by the float 46 coming close to the limit switch L. Further, since the quantity of fluid flowing out of the brake reservoir chamber 28 during vehicle accelerating driving can be limited to a small volume, a bottom face of the corridor 35 can be lowered and so a height of the reservoir body portion 15 can be also lowered, consequently leading to an improved mounting property thereof onto a vehicle.

Additionally, since the communication port 36 between the communication passage 37 and the brake reservoir chamber 28 is located on the rear side in the vehicle longitudinal direction, and the communication port 39 between the branch passage 38 and the clutch reservoir chamber 29 is also located on the rear side in the vehicle longitudinal direction, the branch passage 38 can be shortened, consequently, leading to a downsizing of the reservoir.

Further, the brake reservoir chamber 28 and the clutch reservoir chamber 29 are located alongside in the lateral direction of the vehicle, in other words, the clutch reservoir chamber 29 is located on the lateral side of the brake reservoir chamber 28 in the vehicle, consequently, leading to a downsizing of the reservoir in the vehicle longitudinal direction.

Figure 7:
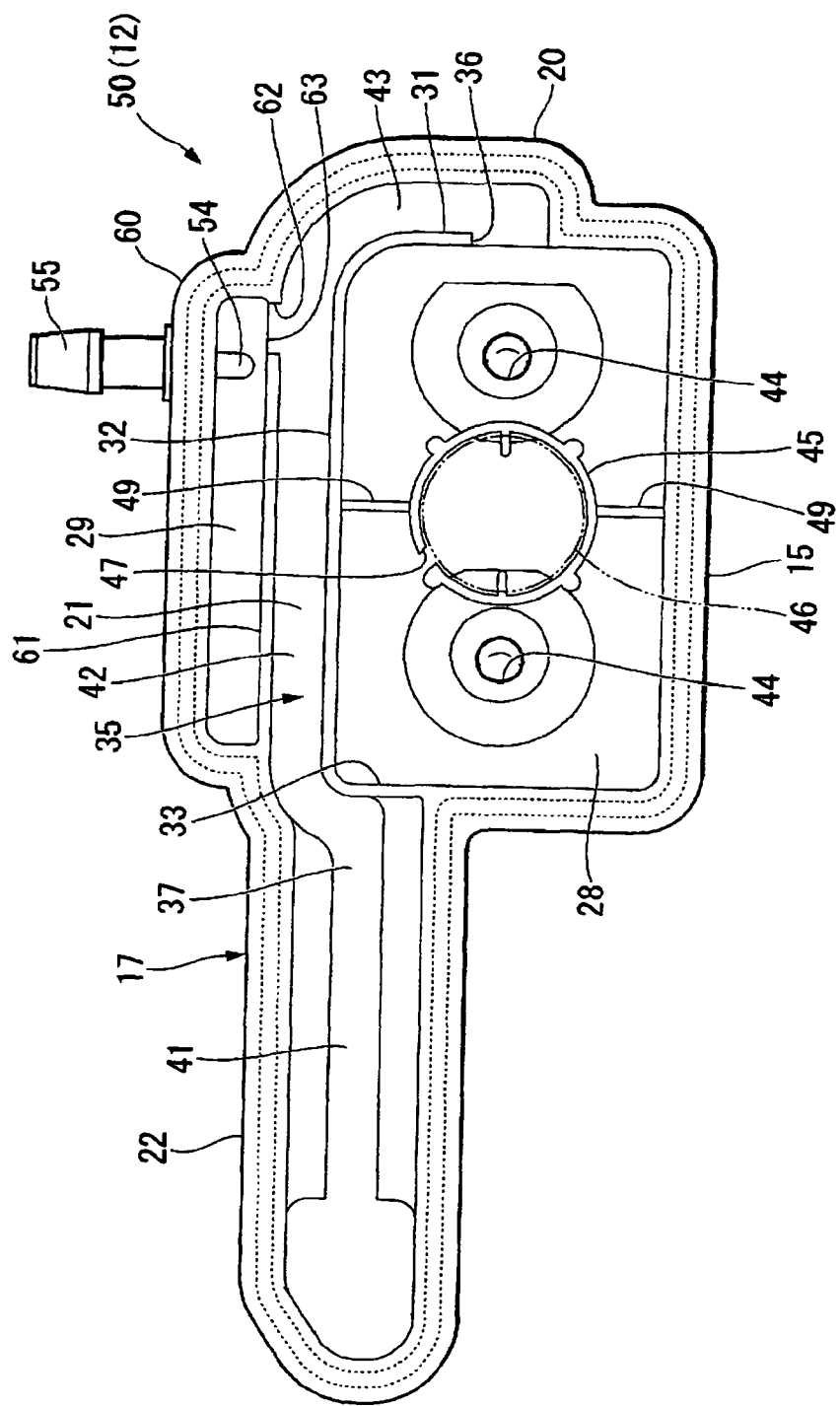
FIG. 7 is a plan view illustrating main components of a reservoir according to a second embodiment of the present invention.

An explanation will be given of a reservoir according to a second embodiment of the present invention mainly in reference to FIG. 7 focusing on portions thereof different from that of the first embodiment. It is to be noted that portions thereof similar to those of the first embodiment are designated with the same notations and an explanation thereof will be omitted.

A reservoir 12 according to the second embodiment has a sub tank 60 formed on an opposite side to the reservoir body portion 15 with the side forming portion 21 of the corridor forming portion 17 arranged therebetween, and the clutch reservoir chamber 29 is formed in the sub tank 60. That is to say, the clutch reservoir chamber 29 is provided on the opposite side to the brake reservoir chamber 28 with the second path portion 42 of the corridor 35 arranged therebetween. The partitioning wall portion 27 and the branch passage 38 in the first embodiment are not provided, and the partitioning wall portion 31 is formed only on a side of the communication passage 37 with respect to the communication port 36. Obviously, the clutch reservoir chamber 29 is not provided in the reservoir body portion 15.

According to the second embodiment, a partitioning wall portion 61 is formed upright in a boundary location between the clutch reservoir chamber 29 and the second path portion 42 of the corridor 35, and the corridor 35 and the clutch reservoir chamber 29 are defined by the partitioning wall portion 61. Herein, a communication port 62 providing communication between the clutch reservoir chamber 29 and the second path portion 42 of the corridor 35 is formed in a rear end portion of the partitioning wall portion 61, and an inside of the communication port 62 is a branch passage 63 branched from the communication passage 37 so as to communicate with the clutch reservoir chamber 29. In other words, the corridor 35 extends from the communication port 36 opening rearward and turns to the front side or to an opposite side of the communication port 36, and it is also branched into the branch passage 63 which communicates with the clutch reservoir chamber 29 formed to be separate from the brake reservoir chamber 28 in a rear area of the reservoir 12.

A bottom portion forming the clutch reservoir chamber 29 of the sub tank 60 is provided in a rear area thereof with a downward recessed flow path concave portion 54, and the external connecting pipe portion 55 for connecting with the clutch master cylinder 57 is provided protruding laterally so as to communicate with the flow path concave portion 54.

A fluid supplied through the inlet port 24 from outside is introduced into the brake reservoir chamber 28 via the communication passage 37 and the communication port 36 to be reserved therein, and also into the clutch reservoir chamber 29 via the branch passage 63 branched from the communication passage 37 to be reserved therein.

According to the reservoir 12 of the second embodiment described above, in a similar way to the first embodiment, the communication passage 37 providing communication between the inlet port 24 and the brake reservoir chamber 28 is branched so as to communicate with the clutch reservoir chamber 29, in other words, the corridor 35 extending from the communication port 36 opening on one side of the brake reservoir chamber 28 and turning to the opposite side from the one side is branched into the branch passage 63 which communicates with the clutch reservoir chamber 29. Further, in the same way as the first embodiment, the inlet port 24 is located on the front side in the vehicle longitudinal direction and the communication port 36 between the communication passage 37 and the brake reservoir chamber 28 is located on the rear side in the vehicle longitudinal direction. In addition, the brake reservoir chamber 28 and the clutch reservoir chamber 29 are arranged alongside in the lateral direction of the vehicle, in other words, the clutch reservoir chamber 29 is located on the lateral side of the brake reservoir chamber 28 in the vehicle. Therefore, the arrangement of the second embodiment may provide an effect similar to that of the first embodiment.

Figure 8:
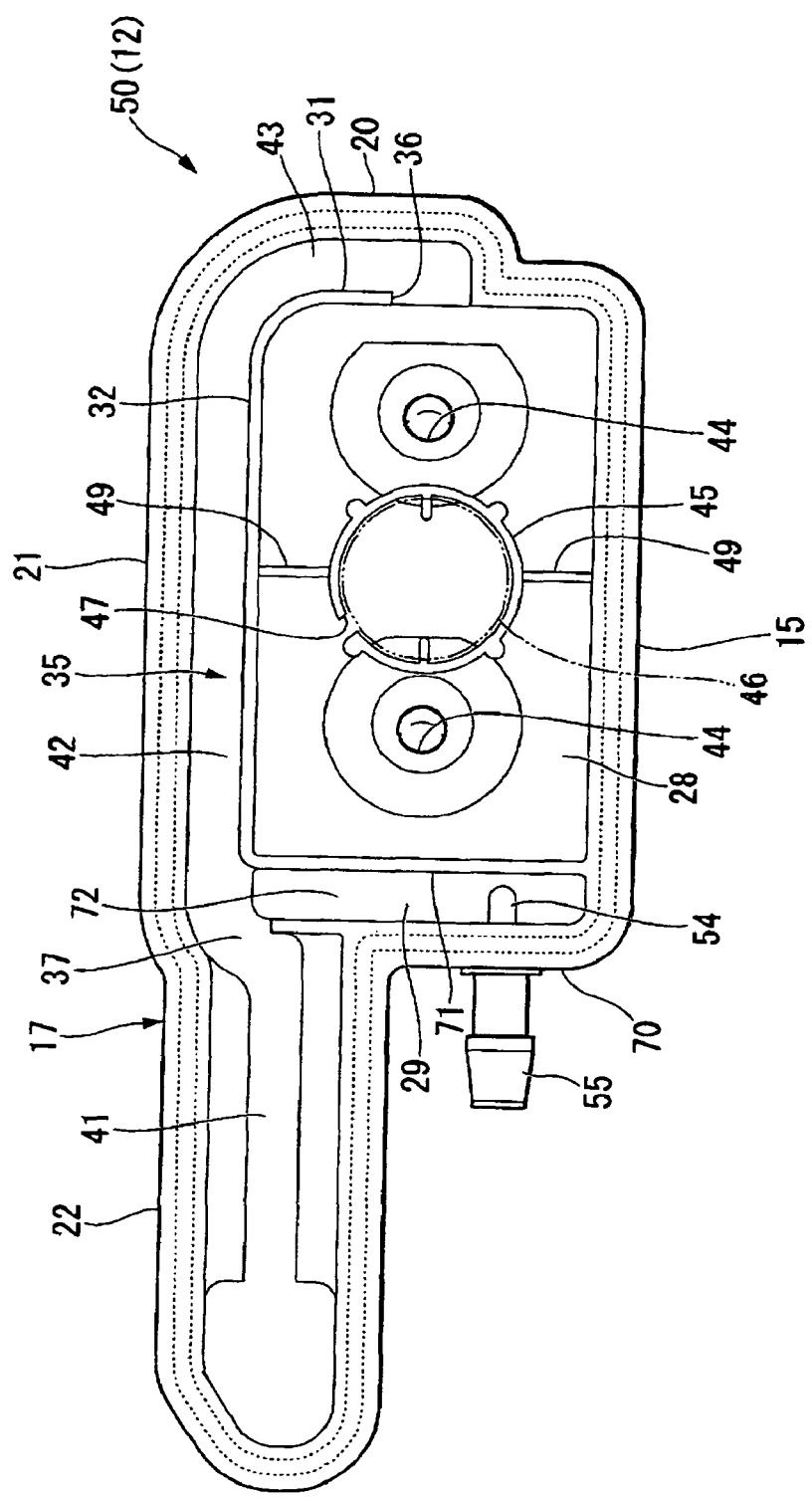
FIG. 8 is a plan view illustrating main components of a reservoir according to a third embodiment of the present invention.

An explanation will be given of a reservoir according to a third embodiment of the present invention mainly in reference to FIG. 8 focusing on a portion thereof different from that of the first embodiment. Further, portions thereof similar to those of the first embodiment are designated with the same notations and an explanation thereof will be omitted.

A reservoir 12 according to the third embodiment includes a reservoir body portion 15 having a forward enlarged portion 70 formed by being expanded therefrom, in which a clutch reservoir chamber 29 is formed. That is to say, the interior of the reservoir body portion 15 is partitioned into the brake reservoir chamber 28 and the clutch reservoir chamber 29 disposed in a front side of the former by a partitioning wall portion 71 formed in a front side of the reservoir body portion 15 so as to extend perpendicular to the longitudinal direction.

A corridor 35 connecting with a communication port 36 of the brake reservoir chamber 28 is provided, in a second path portion 42 at an end portion thereof defined in a first path portion 41 side, with a branch passage 72 branching to a direction of the clutch reservoir chamber 29. The branch passage 72 is provided on the upper side of the clutch reservoir chamber 29. In other words, the corridor 35 extends from the communication port 36 opening rearward and turns toward a front side or toward an opposite side from the communication port 36, and it is also branched into the branch passage 72 which communicates with the clutch reservoir chamber 29 formed to be separate from the brake reservoir chamber 28.

A bottom portion of the forward enlarged portion 70 forming the clutch reservoir chamber 29 is provided with a downward recessed flow path concave portion 54 on an opposite side from the corridor 35 in the lateral direction, and an external connecting pipe portion 55 to be connected to the clutch master cylinder 57 is provided protruding forward so as to communicate with the flow path concave portion 54.

A fluid supplied through the inlet port 24 from outside is introduced into the brake reservoir chamber 28 via the communication passage 37 and from the communication port 36 to be reserved therein, and also into the clutch reservoir chamber 29 via the branch passage 72 branched from the communication passage 37 to be reserved therein.

According to the reservoir 12 of the third embodiment described above, in a similar way to the first embodiment, the communication passage 37 providing communication between the inlet port 24 and the brake reservoir chamber 28 is branched so as to communicate with the clutch reservoir chamber 29, in other words, the corridor 35 extending from the communication port 36 opening to one side of the brake reservoir chamber 28 and turning toward an opposite side from the one side is branched into the branch passage 72 which communicates with the clutch reservoir chamber 29. Further, in the same way as the first embodiment, the inlet port 24 is located in the front side in the vehicle longitudinal direction and the communication port 36 between the communication passage 37 and the brake reservoir chamber 28 is located in the rear side in the vehicle longitudinal direction. Therefore, the arrangement of the third embodiment may provide an effect similar to that of the first embodiment.

Further, since the brake reservoir chamber 28 and the clutch reservoir chamber 29 are arranged alongside in the longitudinal direction, consequently, leading to a downsizing of the reservoir in the lateral direction.

Figure 9:
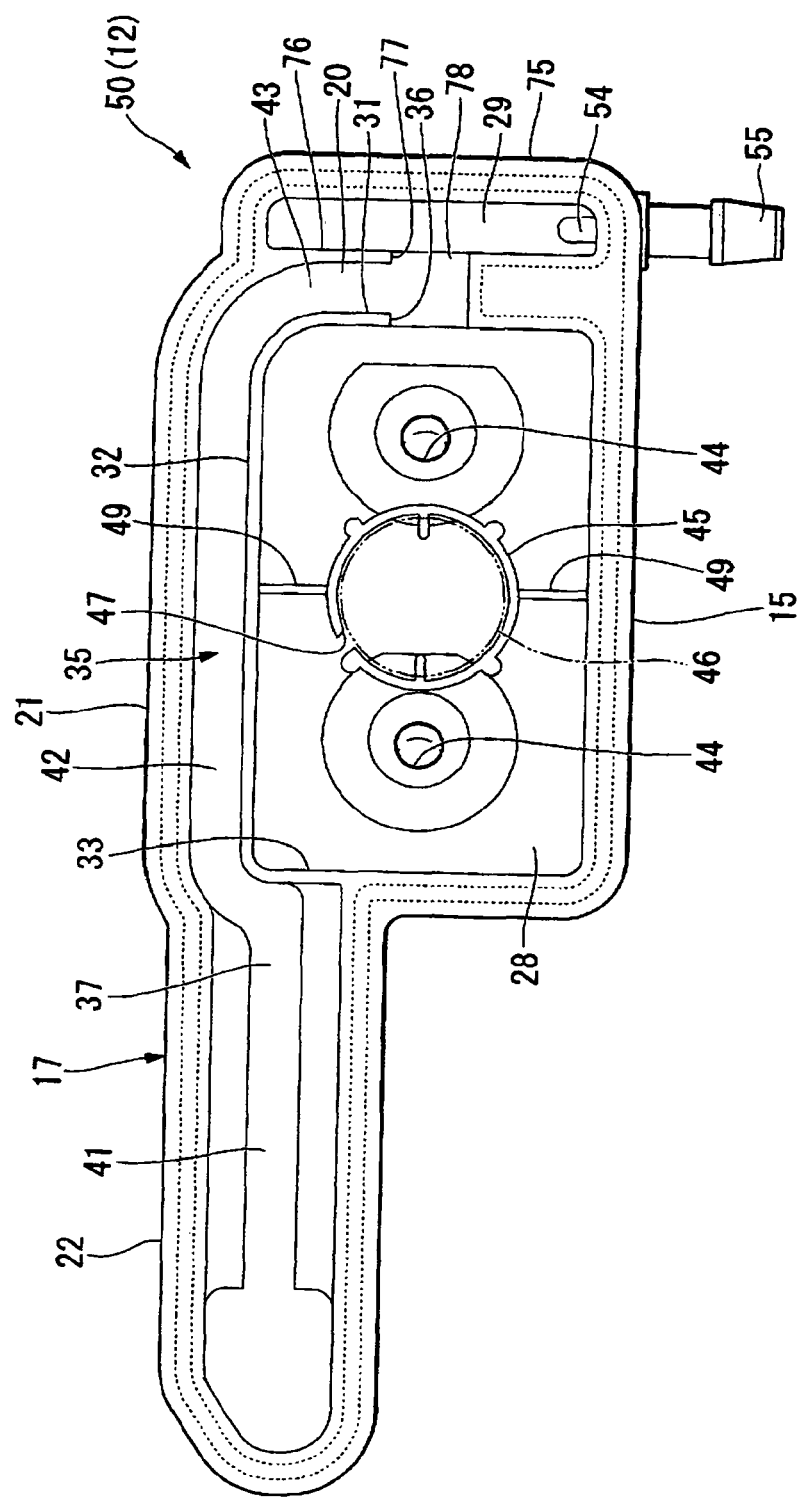
FIG. 9 is a plan view illustrating main components of a reservoir according to a fourth embodiment of the present invention.

An explanation will be given of a reservoir according to a fourth embodiment of the present invention mainly in reference to FIG. 9 focusing on a portion thereof different from that of the first embodiment. It is to be noted that portions thereof similar to those of the first embodiment are designated with the same notations and an explanation thereof will be omitted.

A reservoir 12 according to the fourth embodiment has a sub tank 75 formed on an opposite side to the reservoir body portion 15 with the rear forming portion 20 of the corridor forming portion 17 arranged therebetween, and the clutch reservoir chamber 29 is formed in the sub tank 75. That is to say, the clutch reservoir chamber 29 is provided on the opposite side to the brake reservoir chamber 28 with the third path portion 43 of the corridor 35 arranged therebetween.

According to the fourth embodiment, a partitioning wall portion 76 is formed upright at a boundary location between the clutch reservoir chamber 29 and the third path portion 43 of the corridor 35, and the corridor 35 and the clutch reservoir chamber 29 are separated by the partitioning wall portion 76. Herein, a communication port 77 providing communication between the clutch reservoir chamber 29 and the third path portion 43 of the corridor 35 is provided in the partitioning wall portion 76 at an end portion thereof so as to be opposed to the communication port 36, and an inside of the communication port 77 forms a branch passage 78 branched from the communication passage 37 so as to communicate with the clutch reservoir chamber 29. In other words, the corridor 35 extends from the communication port 36 opening rearward and turns toward a front side or toward an opposite side from the communication port 36, and it is also branched into the branch passage 78 which communicates in the rear area of the reservoir 12 with the clutch reservoir chamber 29 formed to be separate from the brake reservoir chamber 28.

A bottom portion forming the clutch reservoir chamber 29 in the sub tank 75 is provided with a downward recessed flow path concave portion 54 on an opposite side of the clutch reservoir chamber 29 from the corridor 35, and an external connecting pipe portion 55 to be connected to the clutch master cylinder 57 is provided protruding laterally so as to communicate with the flow path concave portion 54.

A fluid supplied through the inlet port 24 from outside is introduced into the brake reservoir chamber 28 via the communication passage 37 and the communication port 36 to be reserved therein, and also into the clutch reservoir chamber 29 via the branch passage 78 branched from the communication passage 37 to be reserved therein.

According to the reservoir 12 of the fourth embodiment described above, in a similar way to the first embodiment, the communication passage 37 providing communication between the inlet port 24 and the brake reservoir chamber 28 is branched so as to communicate with the clutch reservoir chamber 29, in other words, the corridor 35 extending from the communication port 36 opening to one side of the brake reservoir chamber 28 and turning to an opposite side from the one side is branched into the branch passage 78 which communicates with the clutch reservoir chamber 29. Additionally, in the same way as the first embodiment, the inlet port 24 is located on the front side in the vehicle longitudinal direction and the communication port 36 between the communication passage 37 and the brake reservoir chamber 28 is located in a rear side in the vehicle longitudinal direction. Further, in the same way as the first embodiment, the communication port 77 between the branch passage 38 and the clutch reservoir chamber 29 is located in the rear side in the vehicle longitudinal direction. Therefore, the arrangement of the fourth embodiment may provide an effect similar to that of the first embodiment.

Further, since the brake reservoir chamber 28 and the clutch reservoir chamber 29 are arranged alongside in the longitudinal direction, consequently, leading to a downsizing of the reservoir in the lateral direction.

Figure 10:
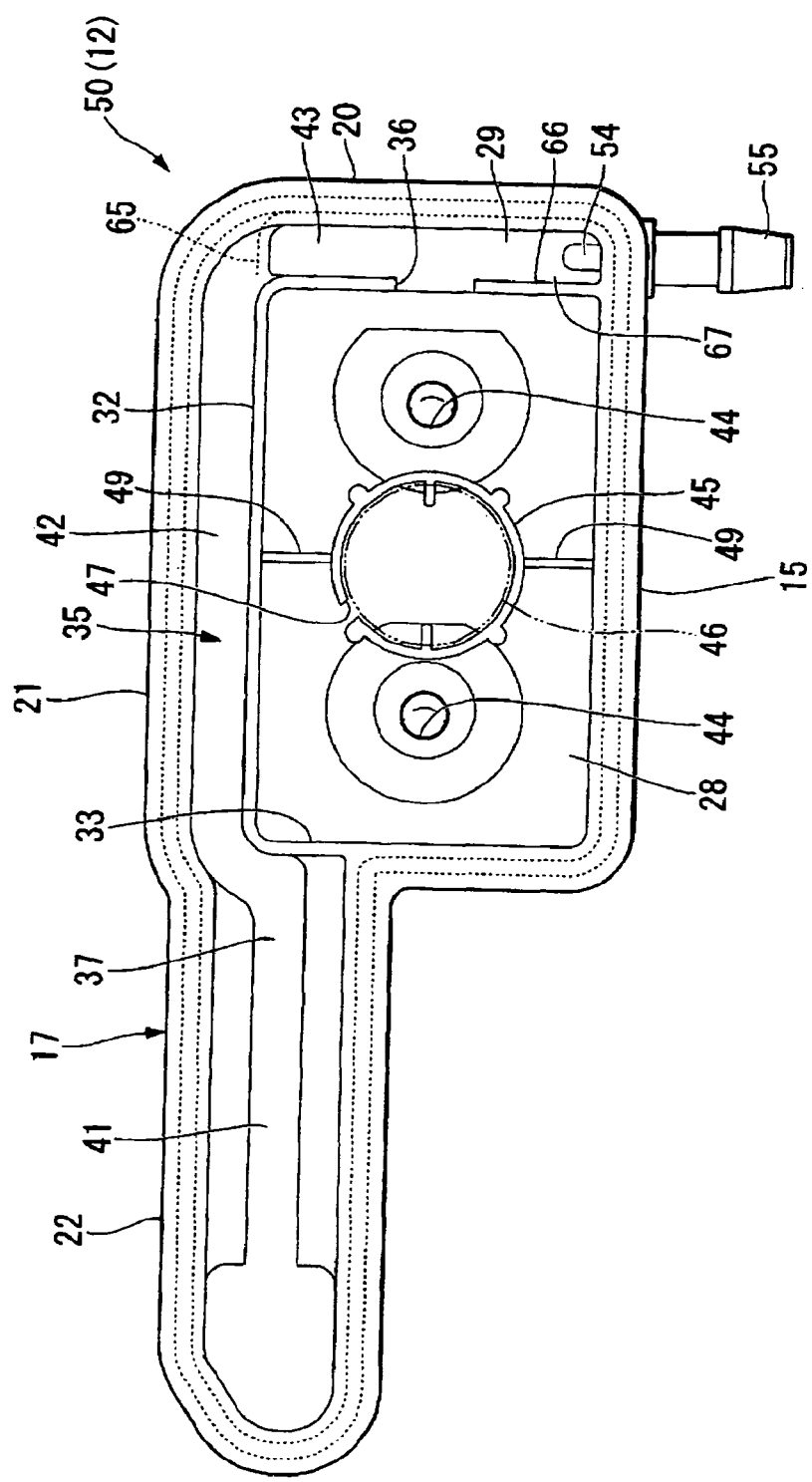
FIG. 10 is a plan view illustrating main components of a reservoir according to a fifth embodiment of the present invention.
Figure 11:
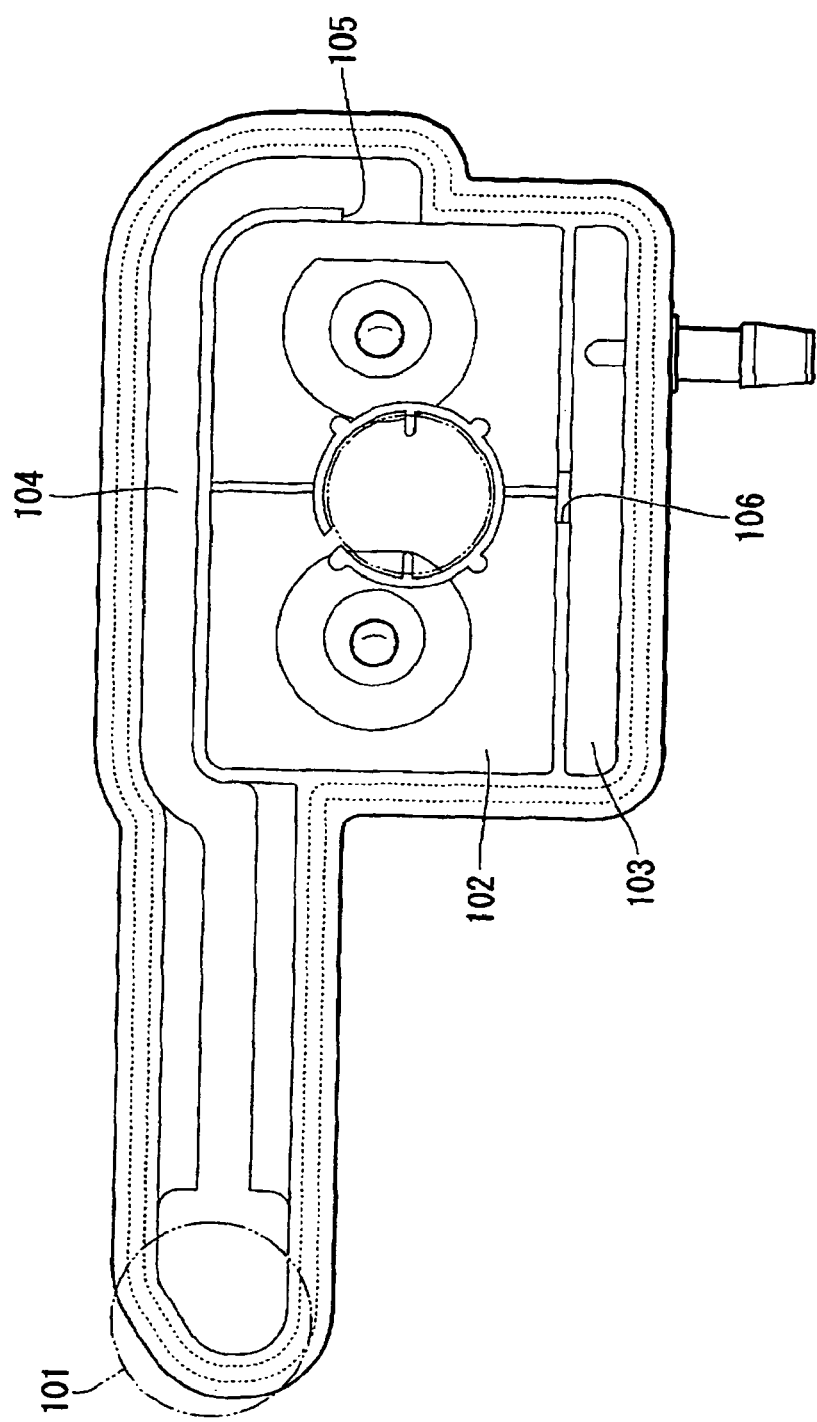
FIG. 11 is a plan view illustrating main components of a reservoir.

An explanation will be given of a reservoir according to a fifth embodiment of the invention mainly in reference to FIG. 10 focusing on portions thereof different from that of the first embodiment. It is to be noted that portions thereof similar to those of the first embodiment are designated with the same notations and an explanation thereof will be omitted.

A reservoir 12 according to the fifth embodiment includes a reservoir body portion 15 having a rearward enlarged portion 65 formed by being expanded therefrom to an under side of a rear forming portion 20 of a corridor forming portion 17, and the clutch reservoir chamber 29 is formed in the rearward enlarged portion 65. That is to say, the interior of the reservoir body portion 15 is partitioned into the brake reservoir chamber 28 and the clutch reservoir chamber 29 disposed in a rear side of the former by a partitioning wall portion 66 formed on a rear side of the reservoir body portion 15 so as to extend perpendicular to the longitudinal direction. The clutch reservoir chamber 29 is provided on an opposite side to the brake reservoir chamber 28 with the third path portion 43 of the communication passage 37 of the corridor 35 arranged therebetween.

Herein, the communication port 36 of the brake reservoir chamber 28 is formed in an upper area of the above mentioned partitioning wall portion 66, and the third path portion 43 of the communication passage 37 of the corridor 35 connecting with the communication port 36 is provided in an upper side of the clutch reservoir chamber 29. A branch passage 67 branched from the communication passage 37 so as to communicate with the clutch reservoir chamber 29 is arranged on an extension of the third path portion 43. The branch passage 67 is also provided in an upper side of the clutch reservoir chamber 29. In other words, the corridor 35 extends from the communication port 36 opening rearward and turns to the front side or to the opposite side from the communication port 36, and it is also branched into the branch passage 67 which communicates with the clutch reservoir chamber 29 formed to be separate from the brake reservoir chamber 28 in a rear area of the reservoir 12.

A bottom portion of the rearward enlarged portion 65 forming the clutch reservoir chamber 29 is provided with a downward recessed flow path concave portion 54 in an opposite side from the longitudinally extending corridor 35, and the external connecting pipe portion 55 to be connected to the clutch master cylinder 57 is provided protruding sideward so as to communicate with the flow path concave portion 54.

A fluid supplied through the inlet port 24 from outside is introduced into the brake reservoir chamber 28 via the communication passage 37 and the communication port 36 to be reserved therein, and also into the clutch reservoir chamber 29 via the communication passage 37 and the branch passage 67 branched from the communication passage 37 to be reserved therein.

According to the reservoir 12 of the fifth embodiment described above, in a similar way to the first embodiment, the communication passage 37 providing communication between the inlet port 24 and the brake reservoir chamber 28 is branched so as to communicate with the clutch reservoir chamber 29, in other words, the corridor 35 extending from the communication port 36 opening to one side of the brake reservoir chamber 28 and turning toward the opposite side to the one side is branched into the branch passage 67 which communicates with the clutch reservoir chamber 29. Therefore, when supplying the fluid supplied from the inlet port 24 with vacuuming, it is possible to fill the brake system including the brake master cylinder 11 with the fluid via the brake reservoir chamber 28 after filling the clutch system including the clutch master cylinder 57 with the fluid via the clutch reservoir chamber 29 having relatively small capacity. Consequently, the time period required to fill the brake system and the clutch system with the fluid with vacuuming can be shortened in comparison to the conventional manner. Further, in the same way as the first embodiment, the inlet port 24 is located on the front side in the vehicle longitudinal direction and the communication port 36 between the communication passage 37 and the brake reservoir chamber 28 is located in the rear side in the vehicle longitudinal direction. Therefore, the arrangement of the fifth embodiment may provide an effect similar to that of the first embodiment.

Further, since the brake reservoir chamber 28 and the clutch reservoir chamber 29 are arranged alongside in the longitudinal direction, leading to a downsizing of the reservoir in the lateral direction.

It is to be noted that in the fifth embodiment, although the clutch reservoir chamber 29 is formed on the rear side of the corridor 35 therealong, the clutch reservoir chamber 29 may be formed in a lateral side of the corridor 35 therealong.

According to the embodiments described above, since the communication passage providing communication between the inlet port and the brake reservoir chamber is branched so as to communicate with the clutch reservoir chamber, therefore when supplying the fluid supplied from the inlet port with vacuuming, it is possible to fill the clutch system including the clutch master cylinder via the clutch reservoir chamber with the fluid in parallel with filling the brake system including the brake master cylinder with the fluid via the brake reservoir chamber, as having been described above.

Further, the inlet port is located in the front side in the vehicle longitudinal direction and the communication port between the communication passage and the brake reservoir chamber is located in the rear side in the vehicle longitudinal direction, so that even in a case an acceleration is applied to the fluid, for example during vehicle accelerating driving, the quantity of fluid flowing out of the brake reservoir chamber can be limited to a small volume. Therefore, also in this viewpoint, a change in the fluid level in the brake reservoir chamber during the vehicle driving can be controlled.

In the first, second, fourth and fifth embodiments, the communication port between the communication passage and the brake reservoir chamber is located in the rear side in the vehicle longitudinal direction, and the communication port between the branch passage and the clutch reservoir chamber is also located in the rear side in the vehicle longitudinal direction, so that the branch passage can be shortened. Consequently, downsizing of the reservoir can be achieved.

In the first and second embodiments, the brake reservoir chamber and the clutch reservoir chamber are arranged alongside in the vehicle lateral direction, consequently leading to a downsizing of the reservoir in the vehicle longitudinal direction.

According to the embodiments described above, the corridor extending from the communication port opening to one side of the brake reservoir chamber and turning toward the opposite side to the one side is branched such that one of the branched communication passages communicates with the communication port while the other of the branched communication passages communicates with the clutch reservoir chamber, so that when supplying a fluid supplied through the inlet port provided in the upper area of the corridor with vacuuming, it is possible to fill the clutch system including the clutch master cylinder with the fluid via the clutch reservoir chamber in parallel with filling the brake system including the brake master cylinder with the fluid via the brake reservoir chamber. Consequently, the time period required to fill the brake system and the clutch system with the fluid with vacuuming can be shortened.

In the first and second embodiments, the clutch reservoir chamber is arranged in the lateral side of the brake reservoir chamber in the vehicle, consequently leading to a downsizing of the reservoir in the vehicle longitudinal direction.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Application No. 2007-112012, filed on Apr. 20, 2007. The entire disclosure of Japanese Patent Application No. 2007-112012 filed on Apr. 20, 2007 including specification, claims, drawings and summary is incorporated herein by reference in its entirety.

The Japanese Patent Application Public Disclosure No. HEI 11-222118 is incorporated herein by reference in its entirety.

What is claimed is:

1. A reservoir comprising:
a brake reservoir chamber adapted to reserve a fluid therein and connected to a brake master cylinder; and
an inlet port for supplying the fluid to said brake reservoir chamber from outside, said reservoir further comprising:
a clutch reservoir chamber separated from said brake reservoir chamber and connected to a clutch master cylinder; and
a communication passage providing a communication between said inlet port and said brake reservoir chamber, wherein said communication passage is branched so as to communicate with said clutch reservoir chamber,
wherein said inlet port is located on a front side in a vehicle longitudinal direction, and a communication port between said communication passage and said brake reservoir chamber is located on a rear side in said vehicle longitudinal direction.

2. The reservoir of claim 1, wherein another communication port, between a branch passage branched from said communication passage and said clutch reservoir chamber, is located on the rear side in the vehicle longitudinal direction.

3. The reservoir of claim 1, wherein said brake reservoir chamber and said clutch reservoir chamber are arranged alongside in a vehicle lateral direction,
wherein path portions of said communication passage extending in said vehicle longitudinal direction are located on one side of said brake reservoir chamber in said vehicle lateral direction, and
wherein said clutch reservoir chamber is located on the other side of said brake reservoir chamber in said vehicle lateral direction, said brake reservoir chamber being sandwiched by said path portions and said clutch reservoir chamber.

4. The reservoir of claim 1, wherein:
said brake reservoir chamber and said clutch reservoir chamber are arranged alongside in a vehicle lateral direction;
said brake reservoir chamber is located on one side of path portions of said communication passage in said vehicle lateral direction, said path portions of said communication passage extending in said vehicle longitudinal direction; and
said clutch reservoir chamber is located on the other side of said path portions, said path portions being sandwiched by said brake reservoir chamber and said clutch reservoir chamber.

5. The reservoir of claim 1, wherein:
said brake reservoir chamber and said clutch reservoir chamber are arranged alongside in a vehicle lateral direction;
said communication port is formed at a mid portion in said vehicle lateral direction of said reservoir; and
another communication port, between a branch passage branched from said communication passage and said clutch reservoir chamber, is formed on an end side in said vehicle lateral direction of said reservoir, said another communication port being apart from said communication port.

6. A reservoir comprising:
a brake reservoir chamber adapted to reserve a fluid therein and connected to a brake master cylinder; and
an inlet port for supplying the fluid to said brake reservoir chamber from outside, said reservoir further comprising:
a communication port opening at one side of said brake reservoir chamber; and
a corridor extending from said communication port and turning to an opposite side of said brake reservoir from said one side and being provided with said inlet port in an upper area thereof, wherein said corridor is arranged such that an inlet port side of said corridor is disposed on a front side in a vehicle longitudinal direction and a communication port side of said corridor is located on a rear side in the vehicle longitudinal direction, and is branched such that one of the branched communication passages is in communication with said communication port, and the other of the branched communication passages is in communication with a clutch reservoir chamber which is separated from said brake reservoir chamber and connected to a clutch master cylinder.

7. The reservoir of claim 6, wherein said clutch reservoir chamber is located on a lateral side of the brake reservoir chamber in a vehicle.

8. The reservoir of claim 7, wherein:
path portions of said corridor extending in said vehicle longitudinal direction are located on one side of said brake reservoir chamber in said vehicle lateral direction, and
said clutch reservoir chamber is located on the other side of said brake reservoir chamber in said vehicle lateral direction, said brake reservoir chamber being sandwiched by said path portions and said clutch reservoir chamber.

9. The reservoir of claim 7, wherein said brake reservoir chamber is located on one side of path portions of said corridor extending in said vehicle longitudinal direction, and said clutch reservoir chamber is located on the other side of said path portions of said corridor extending in said vehicle longitudinal direction, said path portions being sandwiched by said brake reservoir chamber and said clutch reservoir chamber.

10. The reservoir of claim 7, wherein:
said communication port is formed at a mid portion in said vehicle lateral direction of said reservoir; and
another communication port by which the other branched communication passage is in communication with said clutch reservoir chamber is formed on an end side in said vehicle lateral direction of said reservoir, said another communication port being apart from said communication port.

11. The reservoir of claim 6, wherein another communication port by which the other branched communication passage communicates with said clutch reservoir chamber is located on said rear side in said vehicle longitudinal direction.

12. A master cylinder having a reservoir comprising:
a brake reservoir chamber adapted to reserve a fluid therein and connected to a cylinder body; and
an inlet port for supplying the fluid to said brake reservoir chamber from outside,
wherein said reservoir has a clutch reservoir chamber separated from said brake reservoir chamber and connected to a clutch master cylinder;
wherein a communication passage providing communication between said inlet port and said brake reservoir chamber is branched so as to communicate with said clutch reservoir chamber; and
wherein said inlet port of said reservoir is located on a front side in a vehicle longitudinal direction, and a communication port between said communication passage and said brake reservoir chamber is located on a rear side in said vehicle longitudinal direction.

13. The master cylinder of claim 12, wherein another communication port, between a branch passage branched from said communication passage and said clutch reservoir chamber, is located on the rear side in the vehicle longitudinal direction.

14. The master cylinder of claim 12, wherein said brake reservoir chamber and said clutch reservoir chamber of said reservoir are arranged alongside in a vehicle lateral direction,
wherein path portions of said communication passage extending in said vehicle longitudinal direction are located on one side of said brake reservoir chamber in said vehicle lateral direction, and
wherein said clutch reservoir chamber is located on the other side of said brake reservoir chamber in said vehicle lateral direction, said brake reservoir chamber being sandwiched by said path portions and said clutch reservoir chamber.

15. The reservoir of claim 12, wherein a branch passage branched from said communication passage communicates with said clutch reservoir chamber by another communication port different from said communication port.

16. The master cylinder of claim 15, wherein said another communication port, between said branch passage branched from said communication passage and said clutch reservoir chamber, is located on said rear side in said vehicle longitudinal direction.

17. The reservoir of claim 12, wherein:
said brake reservoir chamber and said clutch reservoir chamber are arranged alongside in a vehicle lateral direction;
said brake reservoir chamber is located on one side of path portions of said communication passage in said vehicle lateral direction, said path portions of said communication passage extending in said vehicle longitudinal direction; and
said clutch reservoir chamber is located on the other side of said path portions, said path portions being sandwiched by said brake reservoir chamber and said clutch reservoir chamber.

18. The reservoir of claim 12, wherein:
said brake reservoir chamber and said clutch reservoir chamber are arranged alongside in a vehicle lateral direction;
said communication port is formed at a mid portion in said vehicle lateral direction of said reservoir; and
another communication port between a branch passage branched from said communication passage and said clutch reservoir chamber is formed on an end side in said vehicle lateral direction of said reservoir, said another communication port being apart from said communication port.

19. A reservoir comprising:
a brake reservoir chamber adapted to reserve a fluid therein and connected to a brake master cylinder; and
an inlet port for supplying the fluid to said brake reservoir chamber from outside, said reservoir further comprising:
a clutch reservoir chamber separated from said brake reservoir chamber and connected to a clutch master cylinder; and
a communication passage providing a communication between said inlet port and said brake reservoir chamber via a first communication port, wherein said communication passage is branched so as to communicate with said clutch reservoir chamber via a second communication port that is different than the first communication port communicating with said brake reservoir chamber.

20. The reservoir of claim 19, wherein said inlet port is located on a front side in a vehicle longitudinal direction, and said first communication port, providing a communication between said communication passage and said brake reservoir chamber, is located on a rear side in said vehicle longitudinal direction.

21. The reservoir of claim 20, wherein said second communication port, between a branch passage branched from said communication passage and said clutch reservoir chamber, is located on said rear side in said vehicle longitudinal direction.

* * * * *